United States Patent
Sung et al.

(10) Patent No.: US 6,957,935 B2
(45) Date of Patent: Oct. 25, 2005

(54) CUTTING INSERT WITH CURVED CUTTING EDGE

(75) Inventors: Wook Jung Sung, Cheongju (KR); Kwan Hee Lee, Cheongju (KR); Yong Boo Lee, Cheongju (KR); Young Heum Kim, Cheongju (KR); Hak Kyu Kim, Cheongju (KR); Kyung Bae Kim, Cheongju (KR)

(73) Assignee: Korloy Inc., Cheongju (KR)

( * ) Notice: Subject to any disclaimer, the term of this patent is extended or adjusted under 35 U.S.C. 154(b) by 114 days.

(21) Appl. No.: 10/362,923

(22) PCT Filed: Aug. 16, 2001

(86) PCT No.: PCT/KR01/01388

§ 371 (c)(1),
(2), (4) Date: Feb. 27, 2003

(87) PCT Pub. No.: WO02/18083

PCT Pub. Date: Mar. 7, 2002

(65) Prior Publication Data

US 2004/0037659 A1 Feb. 26, 2004

(30) Foreign Application Priority Data

Aug. 29, 2000 (KR) ......................................... 2000-50426

(51) Int. Cl.[7] ................................................. B23C 5/10
(52) U.S. Cl. ........................................ 407/113; 407/114
(58) Field of Search ................................. 407/113, 114, 407/115, 116

(56) References Cited

U.S. PATENT DOCUMENTS

| 5,447,396 A |  | 9/1995 | Pantzar |
|---|---|---|---|
| 5,544,984 A | * | 8/1996 | Pantzar ........................ 407/113 |
| 5,597,271 A | * | 1/1997 | Men et al. .................... 407/113 |
| 5,951,214 A | * | 9/1999 | Rothballer et al. ........... 407/42 |
| 6,186,705 B1 | * | 2/2001 | Kumar et al. ................ 407/114 |

FOREIGN PATENT DOCUMENTS

| JP | 6-226523 A | 8/1994 |
|---|---|---|
| KR | 94-2876 U | 2/1994 |
| KR | 95-17026 A | 7/1995 |
| KR | 96-555 B1 | 1/1996 |

* cited by examiner

Primary Examiner—Willmon Fridie, Jr.
(74) Attorney, Agent, or Firm—Birch, Stewart, Kolasch & Birch, LLP

(57) ABSTRACT

A cutting insert for a milling machining adapted to be mounted on a milling cutter to carry out cutting operation and having primary and secondary cutting edges provided at sides of a rectangular body, each primary cutting edge having a curved line tangential to the adjacent secondary cutting edge, to reduce the cutting force and improve flatness of the side surface of a machined workpiece. The cutting insert includes an upper face, a bottom face and a plurality of side faces connecting the upper face and the bottom face. The primary cutting edge has chip breakers for guiding chip flow, primary cutting edge land faces and primary cutting edge clearance faces. The primary cutting edges enable a bottom surface and a side surface of a machined workpiece to have a right angle therebetween.

11 Claims, 6 Drawing Sheets

CUTTING INSERT WITH CURVED CUTTING EDGE

This application is the national phase under 35 U.S.C. §317 of PCT International Application No. PCT/KR01/01388 which has an International filing date of Aug. 16, 2001, which designated the United States of America.

TECHNICAL FIELD

The present invention relates, in general, to a cutting insert with arcuate cutting edges adapted to be mounted in a milling cutter for cutting a workpiece in a desired shape, and, more particularly, to a cutting insert for a milling machining which has primary cutting edges, each being composed of an arcuate line becoming the most convex at a point meeting an adjacent secondary cutting edge, as viewed in plan and becoming the most concave at a point meeting the adjacent secondary cutting edge as viewed in front elevation, to carry out milling machining such as plane machining, side machining, slot machining, hole machining or the like. Accordingly, the present invention improves the quality of machined surfaces of a workpiece, reduces cutting resistance leading to lengthening of service life of the cutting insert, and improves flatness of machined surfaces to cause a bottom surface and a machined side surface of a workpiece to have a right angle therebetween, in particular in the case of side surface machining.

BACKGROUND ART

In general, a cutting tool is used in cutting operations for cutting workpieces of various materials, and usually designed to be mounted on a machine tool to carry out a cutting operation for cutting a workpiece in a desired shape.

Such a cutting tool includes a cutting insert having several cutting edges adapted to directly carry out a cutting operation and a cutter body for holding and clamping the cutting insert.

In general, methods for cutting a metal workpiece with such a cutting tool can be divided into two methods, i.e., a method for cutting a rotating workpiece with a stationary cutting tool and a method for cutting a stationary workpiece with a rotating cutting tool.

A milling process belongs to the latter method, and the milling process includes plane machining, side machining, slot machining, hole machining or the like with a milling cutter.

In an effort to reduce cutting resistance, increase the expected life span of a cutting tool and improve the machining quality during the cutting process using a milling tool, an improved shape of the insert and the structure combined with the cutter body has been recently, actively studied and developed. Among the efforts, various efforts to achieve right angles between side faces and a bottom face of the machined workpiece, in the cases of side machining and slot machining, have been proposed.

In Korean Patent Laid-open publication No. 97-61414, a cutting insert is disclosed wherein the respective cutting edges become convex toward their middle planes as viewed in plan, and inclined downwardly toward their middle planes as viewed in side elevation. The cutting insert, is clamped on a cutter body to reduce the cutting resistance and to achieve a right angle between a side face and a bottom face of the machined workpiece, in the case of a side machining.

In the case of the above-mentioned cutting insert, a milling tool is used in which the cutting edges become convex toward their middle planes as viewed in plan and the cutting insert is clamped on the cutter body. Therefore, the right angularity of the machined side surface, i.e., the right angularity between the side faces and the bottom faces of the machined workpiece, can be partially improved but cannot be perfectly achieved in the case of slot machining or side machining. Furthermore, though it is possible to reduce the cutting resistance one to an increase of the radial oblique angle by being clamped on the cutter body, and the cutting resistance can be reduced by an increase of the axial oblique angle, when a workpiece is machined to a depth of one-half or less of the cutting edge width, the cutting resistance is reduced by a decrease of the axial oblique angle in the case of being machined to a depth of one-half or more of the width.

In another publication, U.S. Pat. No. 5,199,827, there is disclosed a cutting insert having cutting edges adapted to cut a portion of a workpiece in the shape of a right angle, in the case of side machining.

In practice, the optimal machining right angularity can be obtained only in the case of having twisting cutting edges, as in an end mill of the integral or soldered type, in order to form a machined surface having an exact right angle. However, the cutting insert has straight cutting edges, a flatness of a side machined by the straight cutting edges is not effective than that machined by the twisting cutting edges. Also, since it is possible to achieve increase of the radial inclined angle and the axial inclined related to the cutting resistance when being clamped on a cutter body, the cutting resistance can be reduced.

DISCLOSURE OF THE INVENTION

Accordingly, the present invention has been made keeping in mind the above problems occurring in the prior art, and an object of the present invention is to provide a cutting insert for a milling machining which has primary cutting edges, each being composed of an arcuate line becoming the most convex at a point meeting the adjacent secondary cutting edge as viewed in plan and becoming the most concave at a point meeting the adjacent secondary cutting edges as viewed in front elevation, to carry out milling machining such as plane machining, side machining, slot machining, hole machining or the like. Accordingly the present invention achieves improving the quality of machined surfaces of a workpiece, reducing cutting resistance leading to lengthening of the service life of the cutting insert, and improving flatness of machined surfaces to cause a bottom surface and a machined side surface of a workpiece to have a right angle therebetween, in particular in the case of side surface machining.

In order to accomplish the above object, the present invention provides a cutting insert for milling machining having an upper face with chip breakers, a bottom face and a plurality of side faces connecting the upper face and the bottom face and adapted to carry out cutting operations such as plane machining, side machining, slot machining, hole machining or the like, wherein primary cutting edges are provided between the side faces and the upper face, each of the primary cutting edges having a gentle arcuate line, as viewed from above and the side; secondary cutting edges are provided between the side faces and the upper face and meeting the adjacent primary cutting edges, each of the secondary cutting edges having a straight line as viewed from above and the side; and corner cutting edges are provided lying between the primary cutting edges and the secondary cutting edges.

The cutting insert may further include first clearance faces and second clearance faces continuously provided between the bottom face and the corner cutting edges; corner cutting edge land faces and corner cutting edge slant faces continuously provided between the corner cutting edge and the upper face; primary cutting edge clearance faces and secondary cutting edge clearance faces continuously provided between the second clearance faces and under the primary and secondary cutting edges; side clearance face provided between the primary and secondary cutting edge clearance faces and the bottom face; primary cutting edge land faces and primary cutting edge slant faces continuously provided between the primary cutting edges and the upper face; secondary cutting edge land faces and secondary cutting edge slant faces continuously provided between the secondary cutting edges and the upper face; and chip breakers formed on the primary cutting edge slant faces, the secondary cutting edge slant faces and the corner cutting edge slant faces.

The cutting insert may be shaped such that its primary cutting edge has an arcuate edge line which becomes convex toward the adjacent secondary cutting edge and becomes extremely convex at a point meeting the adjacent secondary cutting edge as viewed in plan, and the primary cutting edge has an arcuate edge line which is decreased in height toward the adjacent secondary cutting edge and is most decreased in height at a point meeting the adjacent secondary cutting edge as viewed in front elevation.

The cutting insert may be shaped such that its primary cutting edge has a radius of curvature within a range of 300~1200 mm at a point meeting the secondary cutting edge as viewed in plan, and the primary cutting edge has a radius of curvature within a range of 300~1200 mm at a point meeting the secondary cutting edge as viewed in front elevation.

The cutting insert may be shaped such that an initial portion of the primary cutting edge is disposed at a position which is inwardly remote from a straight line connecting the initial portion of the primary cutting edge and the terminating point meeting the adjacent secondary cutting edge, by a distance of 0.005~0.5 mm as viewed in plan. Also, the initial portion of the primary cutting edge is different from the terminating point meeting the adjacent secondary cutting edge by a height of 0.005~0.5 mm as viewed in front elevation.

According to the above-mentioned present invention, the cutting insert for a milling machining is constructed such that the primary cutting edge has an arcuate edge line becoming convex toward the adjacent secondary cutting edge, and then tangential to the straight shaped adjacent secondary cutting edge as viewed in plan, and is gradually decreased in height toward the secondary cutting edge, and then tangential to the straight shaped adjacent secondary cutting edge as viewed in front elevation. With the cutting insert constructed as described above, flatness of a side surface of a machined workpiece is considerably improved in the case of side surface machining, and an inclined angle of the cutting edge is increased, thereby reducing the cutting force required in a cutting operation to be reduced and thus enabling quality improvement of a machined product and a lengthened service life thereof when the cutting insert carries out cutting operation while being clamped on a cutter body.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
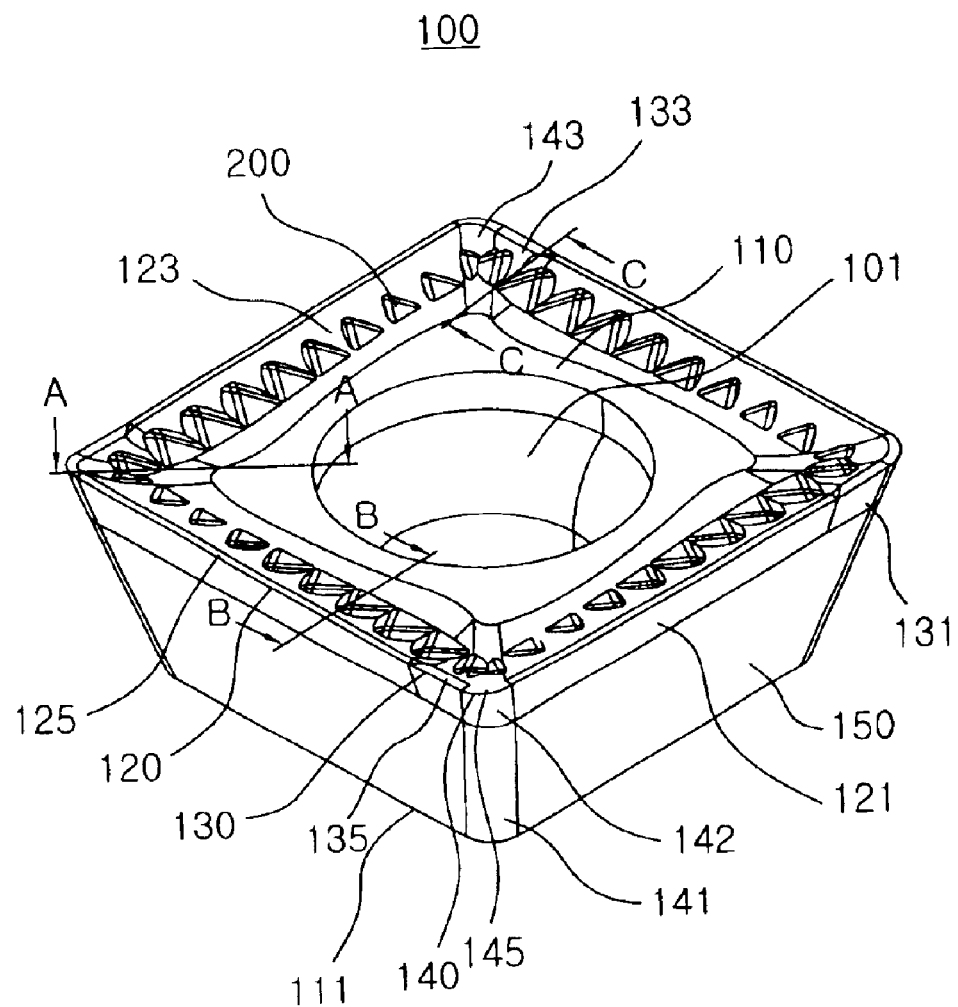
FIG. 1 is a perspective view showing a cutting insert for a milling machining according to an embodiment of the present invention.
Figure 1:

Reference should now be made to the drawings, in which the same reference numerals are used throughout the different drawings to designate the same or similar components.

FIG. 1 is a perspective view showing a cutting insert for a milling machining according to the present invention.

As shown in the drawing, the cutting insert for milling machining according to the invention is usually made of a cemented carbide material utilizing a powder metallurgy process such as an embossing, a sintering, a grinding, a coating or the like. The cutting insert 100 for milling machining uses only its upper face 110 in the case of a cutting operation of ferrous metal or nonferrous metal. For this purpose, only the upper face 110 is provided with chip breakers 200.

The cutting insert 100 is formed at its center portion with a circular aperture 101 which is vertically perforated therethough. The cutting insert 100 is shaped to have four sides as viewed in plan. Four corner portions between the side are provided with corner cutting edges 140, respectively.

Between a bottom face 111 and the corner cutting edge 140 is continuously provided a first clearance face 141 and a second clearance face 142. Between the corner cutting edge 140 and the upper face 110 is also continuously provided a corner cutting edge land face 145 and a corner cutting edge slant face 143.

Between the corner cutting edge 140 is continuously provided a primary cutting edge 120 and a secondary cutting edge 130. The primary cutting edge 120 functions to firstly contact with and cut a workpiece, and is of a gentle arcuate line. The secondary cutting edge 130 functions to improve the roughness of a bottom surface of the cut workpiece, and is of a straight line.

A primary cutting edge clearance face 121 and a secondary cutting edge clearance face 131 are continuously formed between the second clearance face 142 of the corner cutting edge under the primary cutting edge 120 and the secondary cutting edge 130. The primary cutting edge clearance face 121 disposed under the primary cutting edge 120 is composed of a twisted face, the twisting angle of the twisted face being in the range of 3°~15°. A side clearance face 150 is formed between the primary and the secondary cutting edge clearance face 121 and 131 and the bottom face 111.

Between the primary cutting edge 120 and the upper face 110 is continuously provided a primary cutting edge 125 and a primary cutting edge slant face 123. Likewise, between the secondary cutting edge 135 and the upper face 110 is continuously provided a secondary cutting edge land face 135 and a secondary cutting edge slant face 133. A plurality of chip breaker 200 are provided at the primary cutting edge slant face 123, the secondary cutting edge slant face 133 and the corner cutting edge slant face 143.

Figure 2:
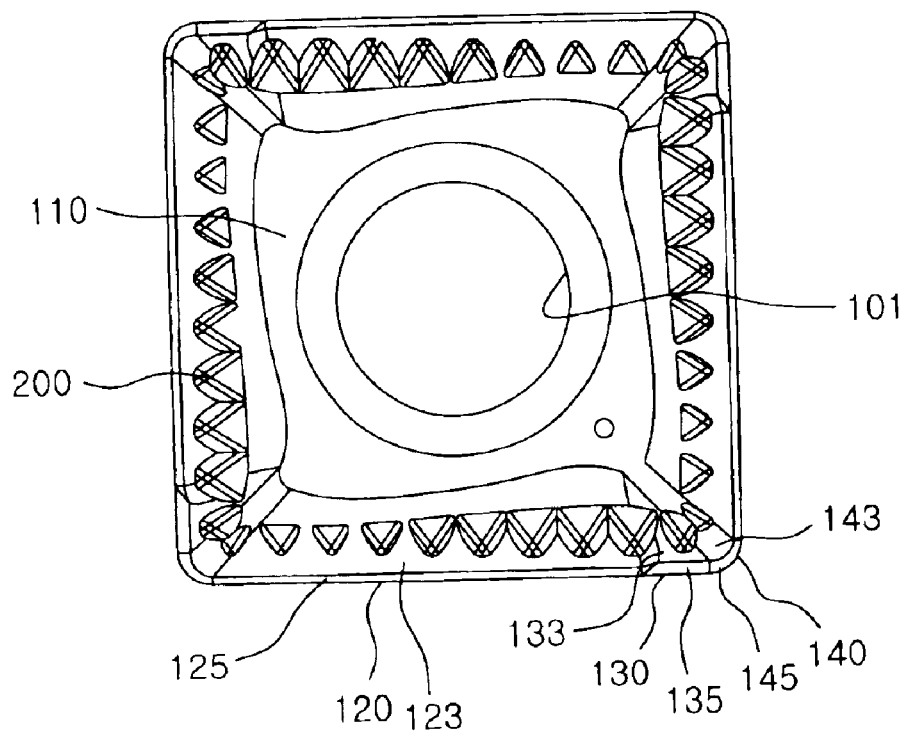
FIG. 2 is a top plan view showing the cutting insert of FIG. 1.
Figure 4:
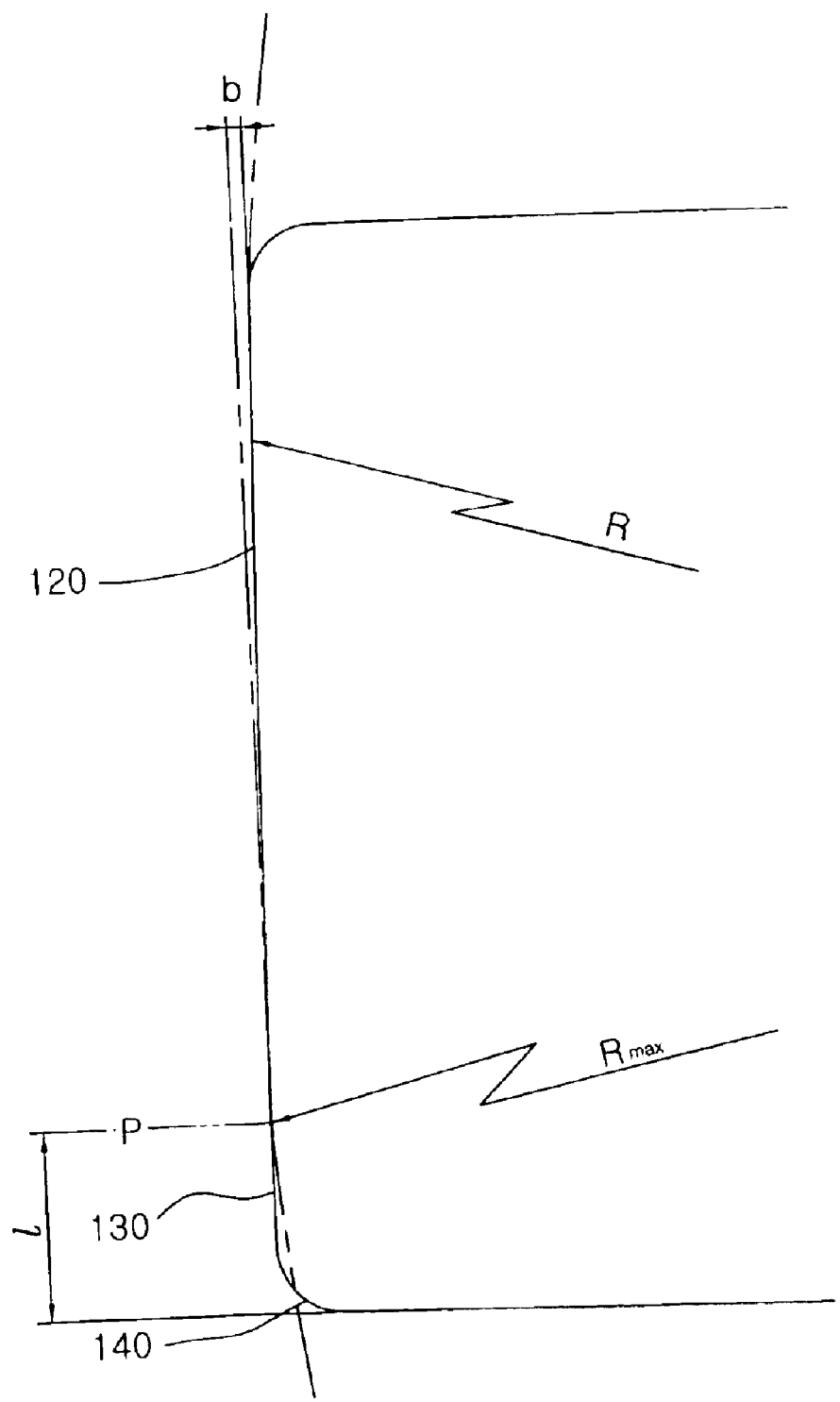
FIG. 4 is an enlarged view of a edge line of the cutting insert of FIG. 2.

FIG. 2 is a top plan view showing the cutting insert for milling machining of FIG. 1, and FIG. 4 is an enlarged view showing a cutting edge of a cutting insert for milling machining of FIG. 2.

As illustrated in the drawings, the cutting edge 120 becomes convex from the corner cutting edge 140 to the secondary cutting edge 130. The arcuate line extended between the primary cutting edge 120 and the secondary cutting edge 130 has a radius of curvature (R) of 300~1200 mm. Therefore, the primary cutting edge 120 is tangential to or positioned inside the secondary cutting edge 130. The arcuate line defined by the primary cutting edge 120 necessarily becomes convex in the extreme at its portion tangential to the secondary cutting edge 130. As a result, the origin of a radius of curvature of the primary cutting edge 120 is necessarily positioned on a line perpendicular to its edge line at a point (P) tangential to the secondary cutting edge 130. A portion of the secondary cutting edge 130, which is tangential to the primary cutting edge 120, is shaped in a straight line.

The initial portion of the primary cutting edge 120 is disposed at a position, which is inwardly remote from the maximum convex point of the secondary cutting edge 130 or the primary cutting edge 120, i.e., its point (P) tangential to the secondary cutting edge 130 by a distance (b) of 0.005~0.5 mm. The secondary cutting edge 130 is extended from the point tangential to the primary cutting edge 120 to the curved corner cutting edge 140 by a length (l) of 0.8~4.0 mm.

Figure 3:
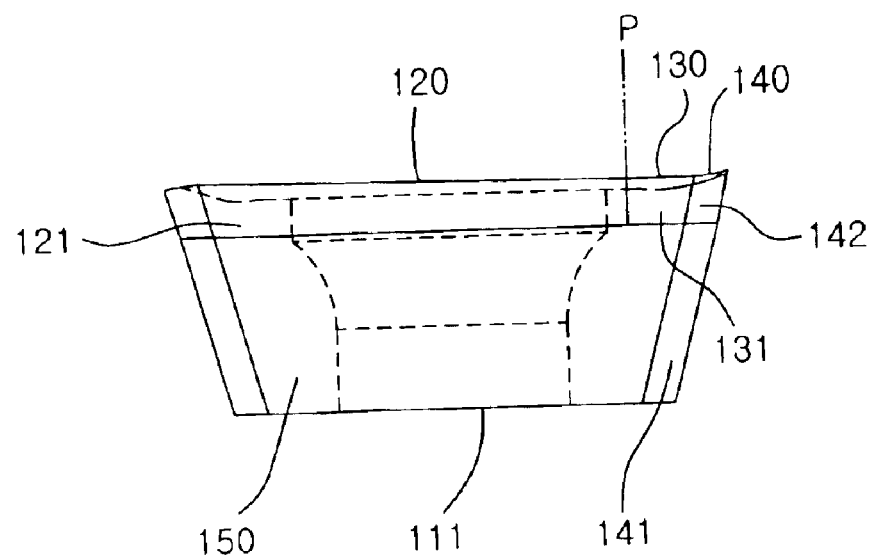
FIG. 3 is a front elevation view of FIG. 1.
Figure 5:
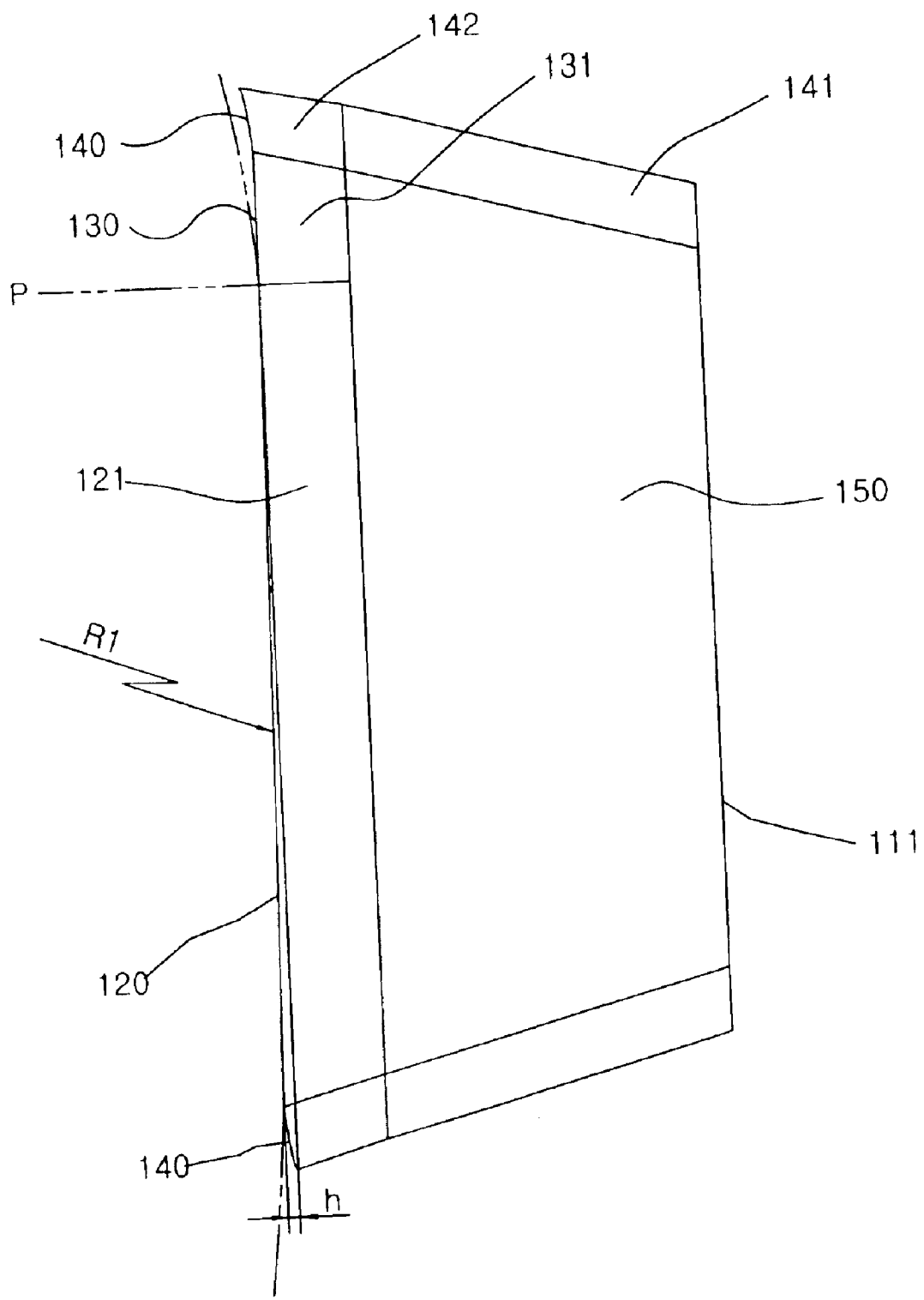
FIG. 5 is an enlarged view of a edge line of the cutting insert of FIG. 3.

FIG. 3 is a front elevation view showing the cutting insert for the milling machining of FIG. 1, and FIG. 5 is an enlarged view showing the cutting insert of FIG. 3.

As shown in the FIGS. 3 and 5, the primary cutting edge 120 is decreased in height toward its adjacent corner cutting edge 140 and is most decreased in height at a position where the primary cutting edge 120 is in contact with the secondary cutting edge 130 as viewed in front elevation.

Therefore, the origin of the radius of the curvature of the primary cutting edge 120 is positioned on the line perpendicular to its edge line at a point (P) tangential to the secondary cutting edge 130. The initial portion of the primary cutting edge 120 is different from the position where the primary cutting edge 120 is in contact with the secondary cutting edge 130 in height, i.e., by a height difference (h) of 0.005~0.5 mm. The secondary cutting edge 130 begins to linearly rise from the position where the primary cutting edge 120 is in contact with the secondary cutting edge 130 to the adjacent corner cutting edge 140 at a constant gradient.

Figure 6:
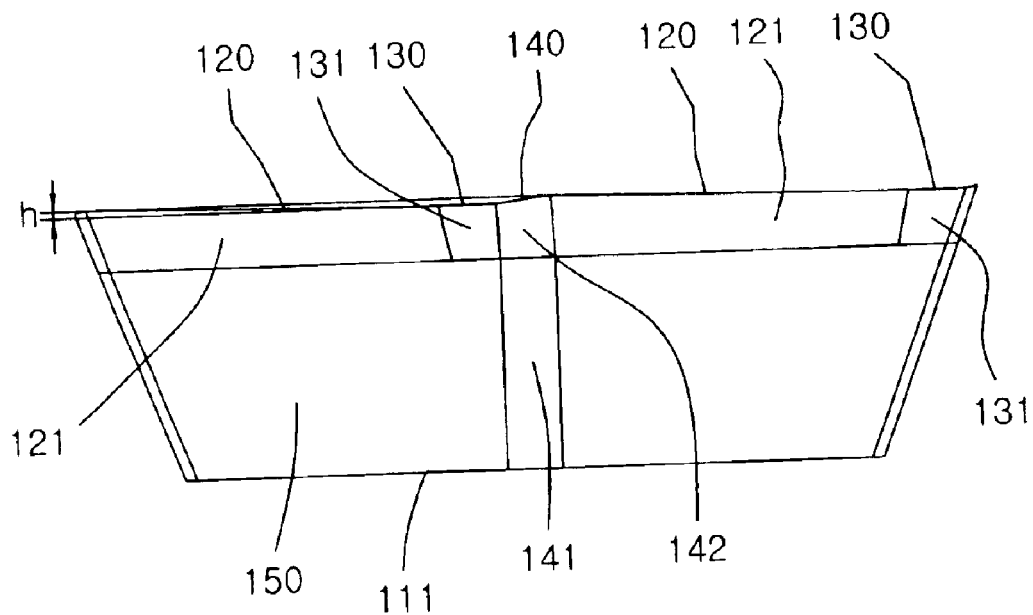
FIG. 6 is a side elevation view of the cutting insert of FIG. 1, as viewed in a diagonal direction.

FIG. 6 is a view of the cutting insert for milling machining of FIG. 1 as viewed in its diagonal direction.

As shown in FIGS. 1 and 6, the corner cutting edge 140 of the cutting insert 100 for a milling machining is composed of an arcuate line connected between the adjacent secondary cutting edge 130 and the adjacent primary cutting edge 120. That is, the corner edge 140 has a curved edge line, which is most decreased in height at its end which meets the adjacent secondary cutting edge 130, gradually increasing in the direction of the primary cutting edge 120, and is most increased at the other end meeting the adjacent primary cutting edge 120 due to the height difference of the adjacent secondary cutting edge 130 and the adjacent primary cutting edges 120 disposed at the opposite sides thereof.

As a result, the corner cutting edge 140 has a height difference (h) of 0.005~0.5 mm at its both ends meeting the adjacent secondary cutting edge 130 and the primary cutting edge 120. This height difference causes the radial inclined angle to be increased in a state of being clamped on a cutter body (not shown), and also causes the point meeting the adjacent primary cutting edge 120 to be most increased in height to increase the axial inclined angle, thereby reducing the cutting resistance.

The corner cutting edge land face 145 is shaped such that its width is in the range of 0~0.5 mm at its end meeting the adjacent secondary cutting edge land face 35, gradually decreases toward the primary cutting edge land face 125, and is in the range of 0~0.4 mm at its other end meeting the adjacent primary cutting edge land face 125.

The corner cutting edge land face 145 is also shaped such that its inclined angle is in the range of −10°~+25° at its end meeting the adjacent secondary cutting edge land face 135, gradually increases toward the primary cutting edge land face 125, and is in the range of −25°~+30° at its other end meeting the adjacent primary cutting edge land face 125.

Figure 7:
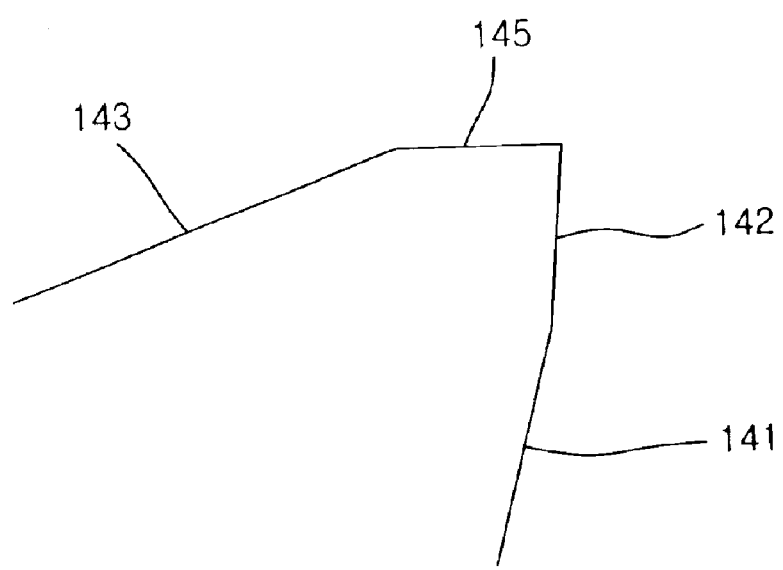
FIG. 7 is a cross-sectional view taken along the line A—A of FIG. 1.
Figure 8:
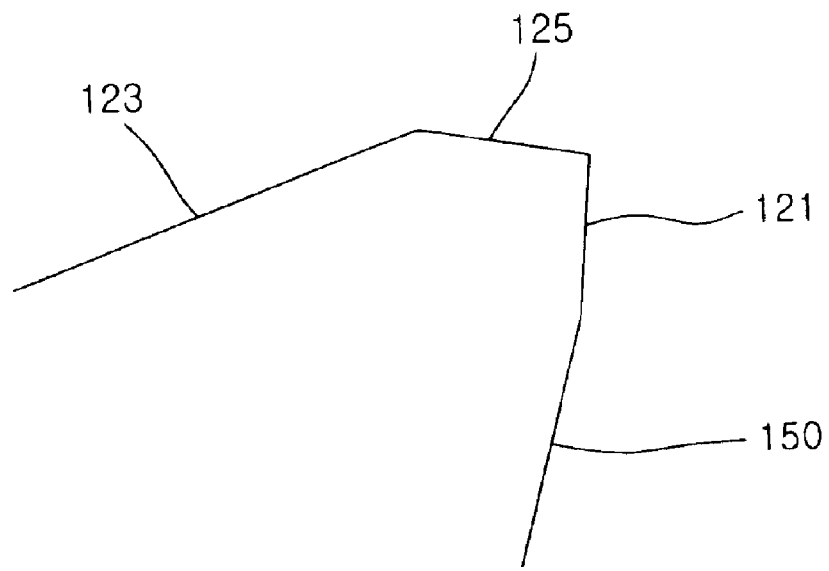
FIG. 8 is a cross-sectional view taken along the line B—B of FIG. 1.
Figure 9:
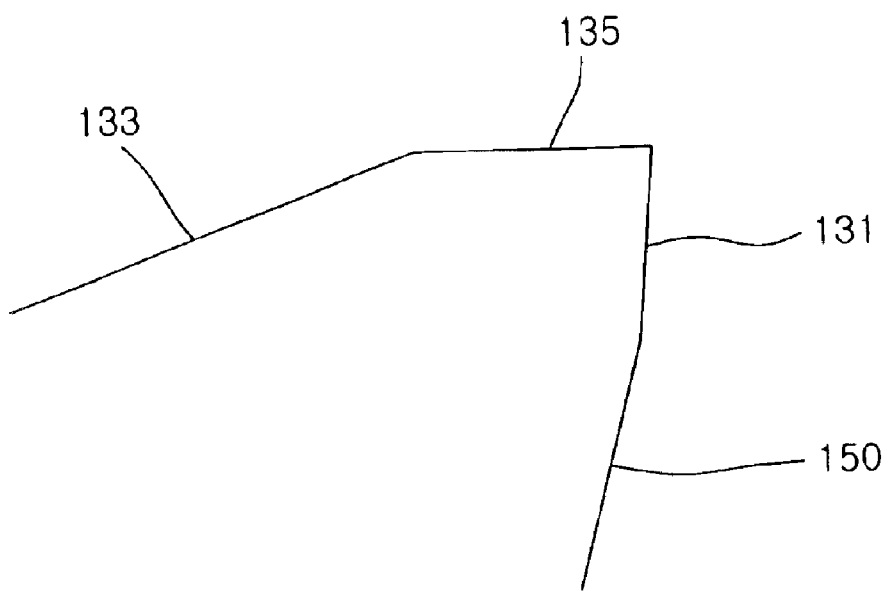
FIG. 9 is a cross-sectional view taken along the line C—B of FIG. 1.

FIG. 7 is a cross-sectional view taken along the line A—A of FIG. 1, FIG. 8 is a view similar to FIG. 7, taken along the line B—B of FIG. 1, and FIG. 9 is a view similar to FIG. 7, taken along the line C—C of FIG. 1.

As shown in FIG. 8, the primary cutting edge land surface 125 has a width of 0~0.4 mm and an inclined angle of −25°~+30°. The primary cutting edge land face 125, with which chips formed during a cutting operation of a workpiece are first contacted, is designed to reinforce the strength of the primary cutting edge 120 that is otherwise reduced by the wear of its upper face owe to contact with chips, thereby preventing breakage or damage thereof.

The primary cutting edge clearance face 121, which is a side face of the primary cutting edge 120, is twisted by the shape of the primary cutting edge 120 and the side face clearance face 150, and thus its clearance angle is gradually changed along its length. This enables the cutting resistance to be effectively controlled and the primary cutting edge 120 to be reinforced during the cutting operation. A clearance angle of an area between a portion of the primary cutting edge clearance face 121 corresponding to the initial portion of the primary cutting edge 120 and a portion corresponding to a portion at which the primary cutting edge 120 and the secondary cutting edge 130 meet each other, i.e. a portion at which the primary cutting edge clearance face 121 and the secondary cutting edge clearance face 131 meet each other, changes within a range of 5°~17° along its length.

The straight secondary cutting edge 130, meeting the adjacent primary cutting edge 120, is defined by the secondary cutting edge land face 135 and the secondary cutting edge clearance face 131. The width of the secondary cutting edge land face 135 is in the range of 0~0.5 mm and its inclined angle is in a range of −10~+25°. The secondary cutting edge land face 135 is essentially shaped such that its width is wider than that of the primary cutting edge land face 125 and its inclined angle is smaller than that of the primary cutting edge land face 125, thereby improving the roughness of the bottom surface of the cut workpiece and reducing the cutting force.

As mentioned above, the cutting insert 100 for milling machining according to the present invention is clamped on a cutter body in such a way that a screw is threaded in the circular aperture 101 vertically formed at the center of the cutting insert 100. At this point, the cutting insert 100 is clamped such that its axial inclined angle with regard to the axis of the cutter body is in a range of 3°~18° and its radial inclined angle with regard to the radial direction of the cutter body is in a range of −3°~−13°, so as to achieve the effects of a decrease of cutting resistance during the cutting operation, improved quality of a machined product and lengthened service life of the cutting tool.

Industrial Applicability

As described above, the present invention provides a cutting insert for milling machining adapted to be clamped on a cutter body in order to carry out plane machining, side surface machining, slot machining, hole machining of a workpiece, or the like. The cutting insert is shaped such that its primary cutting edge has an arcuate line tangential to the secondary cutting edge as viewed from above as well as from the side, and the primary cutting edge is most increased in height at its initial end portion and is most decreased in height at its other end meeting the adjacent secondary cutting edge. Therefore, it is possible to improve a right angularity between a side surface and a bottom surface of a machined workpiece, and to increase an inclined angle during a cutting operation, thereby reducing the load applied to the cutting tool.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A cutting insert for milling machining having an upper face with chip breakers, a bottom face and a plurality of side faces connecting the upper face and the bottom face and adapted to carry out cutting operations such as plane machining, side machining, slot machining, hole machining or the like comprising:

primary cutting edges provided between the side faces and the upper face, each of the primary cutting edges having a gentle arcuate line as viewed from above and side;

secondary cutting edges provided between the side faces and the upper face and meeting the adjacent primary cutting edges, each of the secondary cutting edges having a straight line as viewed from above and the side; and corner cutting edges lying between the primary cutting edges and the secondary cutting edges, said cutting insert further comprising:

first clearance faces and second clearance faces continuously provided between the bottom face and the corner cutting edges;

corner cutting edge land faces and corner cutting edge slant faces continuously provided between the corner cutting edge and the upper face;

primary cutting edge clearance faces and secondary cutting edge clearance faces continuously provided between the second clearance faces and under the primary and secondary cutting edges;

side clearance face provided between the primary and secondary cutting edge clearance faces and the bottom face;

primary cutting edge land faces and primary cutting edge slant faces continuously provided between the primary cutting edges and the upper face;

secondary cutting edge land faces and secondary cutting edge slant faces contionusly provided between the secondary cutting edges and the upper face; and chip breakers formed on the primary cutting edge slant faces, the secondary cutting edge slant faces and the corner cutting edge slant faces, wherein the primary cutting edge has an arcuate edge line which becomes convex toward the adjacent secondary cutting edge and becomes the most convex at the point meeting the adjacent secondary cutting edge as viewed in plan, and the primary cutting edge has an arcuate edge line which is decreased in height toward the adjacent secondary cutting edge and is most decreased in height at the point meeting the adjacent secondary cutting edge as viewed in front elevation and wherein the primary cutting edge has a radius of curvature within a range of 300~1200 mm at the point meeting the secondary cutting edge as viewed in plan, and the primary cutting edge has a radius of curvature within a range of 300~1200 mm at the point meeting the secondary cutting edge as viewed in front elevation.

2. The cutting insert as set forth in claim 1, in which the origin of the radius of curvature of the primary cutting edge is positioned on a line perpendicular to its edge line at which the primary cutting edge meets the adjacent secondary cutting edge as viewed in plan, and the origin of the radius of curvature of the primary cutting edge is positioned on a line perpendicular to its edge line at which the primary cutting edge meets the adjacent secondary cutting edge as viewed in front elevation.

3. The cutting insert as set forth in claim 1, in which an initial portion of the primary cutting edge is disposed at a position which is inwardly remote from straight line connecting the initial portion of the primary cutting edge and the terminating point meeting the adjacent secondary cutting edge by a distance of 0.005~0.5 mm as viewed in plan, and the initial portion of the primary cutting edge is different from the terminating point meeting the adjacent secondary cutting edge by a height of 0.005~0.5 mm as viewed in front elevation.

4. The cutting insert as set forth in claim 3, in which the corner cutting edge is gradually increased in height from the adjacent secondary cutting edge to the adjacent primary cutting edge.

5. The cutting insert as set forth in claim 4, in which the corner cutting edge has a height difference of 0.005~0.5 mm between its both ends.

6. The cutting insert as set forth in claim 1, in which the primary cutting edge clearance face adjacent to the primary cutting edge is composed of a twisted face having a twisting angle of 3°~15°.

7. The cutting insert as set forth in claim 1, in which the secondary cutting edge land face has a width larger than that of the primary cutting edge land face.

8. The cutting insert as set forth in claim 1, in which the inclined angle of the secondary cutting edge land face is smaller than that of the primary cutting edge land face.

9. The cutting insert as set forth in claim 1, in which the corner cutting edge land face is decreased in width from the secondary cutting edge land face to the primary cutting edge land face.

10. The cutting insert as set forth in claim 9, in which the inclined angle of the corner cutting edge land face is in a range of −10°~+25° at a point meeting the secondary cutting edge land face, is gradually increased toward the primary cutting edge land face, and is in a range of −25°~+30° at a point meeting the primary cutting edge land face.

11. A milling machine containing the cutting insert of claim 1.